(12) United States Patent
Lin (10) Patent No.: US 10,849,165 B2
(45) Date of Patent: Nov. 24, 2020

(54) HANDLING OF SIMULTANEOUS TRANSMISSION OF PRACH AND OTHER UPLINK CHANNELS IN MOBILE COMMUNICATIONS

(71) Applicant: MediaTek Inc., Hsinchu (TW)

(72) Inventor: Guan-Yu Lin, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/377,206

(22) Filed: Apr. 6, 2019

(65) Prior Publication Data

US 2019/0313462 A1  Oct. 10, 2019

Related U.S. Application Data

(60) Provisional application No. 62/653,563, filed on Apr. 6, 2018.

(51) Int. Cl.
*H04W 74/08* (2009.01)
*H04W 72/12* (2009.01)

(52) U.S. Cl.
CPC .... *H04W 74/0833* (2013.01); *H04W 72/1205* (2013.01)

(58) Field of Classification Search
CPC ......... H04W 74/0833; H04W 72/1284; H04W 72/1205
See application file for complete search history.

(56) References Cited

U.S. PATENT DOCUMENTS

| 2015/0189645 | A1* | 7/2015 | Maeda | H04L 1/1858 |
| | | | | 370/336 |
| 2017/0295511 | A1* | 10/2017 | Sebire | H04W 74/0833 |
| 2017/0367110 | A1 | 12/2017 | Li et al. | |
| 2018/0278467 | A1* | 9/2018 | John Wilson | H04W 72/046 |
| 2019/0174525 | A1* | 6/2019 | Kwak | H04L 5/00 |
| 2019/0215783 | A1* | 7/2019 | Chakraborty | H04W 52/34 |

FOREIGN PATENT DOCUMENTS

| CN | 104025676 A | 9/2014 |
| CN | 106416411 A | 2/2017 |
| CN | 107529228 A | 12/2017 |

OTHER PUBLICATIONS

China National Intellectual Property Administration, International Search Report and Written Opinion for International Patent Application No. PCT/CN2019/081763, dated Jul. 5, 2019.

(Continued)

*Primary Examiner* — Brian D Nguyen
(74) *Attorney, Agent, or Firm* — Han IP PLLC; Andy M. Han (57) ABSTRACT

Techniques and examples of handling of simultaneous transmission of physical random access channel (PRACH) and other uplink (UL) channels in mobile communications are described. An apparatus (e.g., user equipment (UE)) determines to skip an UL transmission to a wireless network for either a first procedure or a second procedure. Responsive to determining to skip transmission of the first procedure, the apparatus performs the second procedure and also adjusts one or more parameters associated with the first procedure.

12 Claims, 4 Drawing Sheets

(56) References Cited

OTHER PUBLICATIONS

Nokia et al., Remaining issues on SR for sTTI, 3GPP TSG-RAN WG2 #100, R2-1712972, Reno, USA, Nov. 27-Dec. 1, 2017.
Taiwan Intellectual Property Office, Office Action for Taiwan Patent Application No. 108112160, dated Jul. 10, 2020.
3GPP, 3rd Generation Partnership Project; Technical Specification Group Radio Access Network; Evolved Universal Terrestrial Radio Access (E-UTRA); Medium Access Control (MAC) protocol specification (Release 15), 3GPP TS 36.321 V15.1.0, Mar. 2018.
Ericsson, Partial overlapping of Pucch resources, 3GPP TSG RAN WG1 Meeting #92, R1-1803531, Athens, Greece, Feb. 26-Mar. 2, 2018.
Lenovo et al., Scheduling Request procedure, 3GPP TSG-RAN WG2 NR AH#1, R2-1800681, Vancouver, Canada, Jan. 22-26, 2018.

* cited by examiner

HANDLING OF SIMULTANEOUS TRANSMISSION OF PRACH AND OTHER UPLINK CHANNELS IN MOBILE COMMUNICATIONS

CROSS REFERENCE TO RELATED PATENT APPLICATION

The present disclosure claims the priority benefit of U.S. Provisional Patent Application No. 62/653,563, filed on 6 Apr. 2018, the content of which is herein incorporated by reference in its entirety.

TECHNICAL FIELD

The present disclosure is generally related to mobile communications and, more particularly, to handling of simultaneous transmission of physical random access channel (PRACH) and other uplink (UL) channels in mobile communications.

BACKGROUND

Unless otherwise indicated herein, approaches described in this section are not prior art to the claims listed below and are not admitted as prior art by inclusion in this section.

Based on current $3^{rd}$-Generation Partnership Project (3GPP) specification for New Radio (NR) medium access control (MAC), if selected scheduling request (SR) and PRACH resources are overlapped in time, it is up to user equipment (UE) implementation how to select between SR and PRACH for transmission. However, under current 3GPP specification, there is no state update for the one (SR or PRACH) that is skipped (not selected for transmission). For example, if SR is skipped, a counter associated with SR (SR_COUNTER) would not be decremented by 1, and a timer associated with SR (sr-prohibitTimer) would keep running; accordingly, the UE would not be able to send the next SR immediately. As another example, if PRACH is skipped, a preamble transmission counter would not be decremented by 1, and a random access response (RAR) window would still be started; accordingly, the next preamble would not be transmitted until the RAR window expires. As a result, the UE would suffer from additional SR or PRACH latency.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus determining to skip an UL transmission to a wireless network for either a first procedure or a second procedure. Responsive to determining to skip transmission of the first procedure, the method may involve the processor performing the second procedure as well as adjusting one or more parameters associated with the first procedure.

In one aspect, a method may involve a physical layer (PHY) of a processor of an apparatus determining to skip an UL transmission to a wireless network for either a first procedure or a second procedure. The method may also involve the PHY signaling an indication to a medium access control layer (MAC) of the processor regarding the determining to skip. The method may additionally involve the MAC updating a status of one or more parameters of the first procedure or the second procedure which is skipped to a status before the MAC signals the PHY to perform the UL transmission for the first procedure or the second procedure which is not skipped. The method may further involve the PHY performing the UL transmission for one of the first procedure and second procedure which is not skipped.

In one aspect, an apparatus may include a transceiver and a processor coupled to the transceiver. During operation, the transceiver may wirelessly communicate with a wireless network. During operation, the processor may perform operations including: (a) determining to skip an UL transmission to the wireless network for either a first procedure or a second procedure; and (b) responsive to determining to skip transmission of the first procedure: (i) performing, via the transceiver, the second procedure; and (ii) adjusting one or more parameters associated with the first procedure.

It is noteworthy that, although description provided herein may be in the context of certain radio access technologies, networks and network topologies such as 5G NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Unlike in LTE, in NR a MAC entity may have parallel SR procedure and random access channel (RACH) procedure because the two procedures do not prevent each other from running or being triggered if the RACH procedure is initiated by a pending SR or beam recovery. The RACH procedure triggered by a pending SR of a logical channel (LCH) may cause PRACH transmission to collide with a physical uplink control channel (PUCCH), which is for SR transmission of an ongoing SR procedure, or physical uplink shared channel (PUSCH), which is for data transmission, for other LCHs. Based on radio layer 1 (RAN1) agreement, PRACH has an absolute priority over PUCCH/PUSCH in carrier aggregation (CA).

Within a UE, typically the physical layer (PHY) prioritizes PRACH over PUCCH/PUSCH. However, from radio layer 2 (RAN2) point of view, PRACH has lower priority than PUCCH/PUSCH if PRACH transmission is for low-priority data arrival. As such, the physical layer may prioritize PRACH over PUCCH/PUSCH, even though this is not preferred if RACH is for low-priority data. Consequently, unideal prioritization of PRACH may negatively impact scheduling of the following: (1) PUCCH transmission for SR transmission of higher-priority data arrival, and (2) PUSCH transmission for data of LCH with high-priority data. Without the information of RACH intention from the MAC layer (MAC), however, the physical layer cannot determine the priority of PRACH and PUCCH/PUSCH for the UE to drop or perform power scaling. In addition, simultaneous transmission of more than one UL channels at the same time or in the same slot may impact design complexity or implementation cost if the simultaneous transmission occurs in a single cell.

In the present disclosure, the term "overlap" refers to a situation in which either: (i) UL channels are scheduled with at least one symbol overlapped in time, or (ii) UL channels are scheduled or transmitted in the same slot. That is, UL channels are considered as overlapped in an event that UL channels are scheduled in the same slot even if they are scheduled in separate symbols.

In view of the above, the present disclosure aims to provide various solutions and/or schemes to address the aforementioned issues. Under a proposed scheme in accordance with the present disclosure, PHY may select between SR and PRACH for transmission while there is no need for the MAC to do anything. As for how the PHY selects between SR and PRACH for transmission, it may be up to UE implementation. For instance, the PHY may specify a prioritization rule. Under the proposed scheme, PHY may transmit the one (either SR or RACH) with an early starting symbol of transmission. Alternatively, or additionally, PHY may transmit the one (either SR or RACH) with a shorter or longer transmission duration. Alternatively, or additionally, PHY may prioritize SR over RACH regardless. One reasons for this option is that, currently for connected UE, the case with RACH prioritizing over SR is beam recovery; however, when beam failure occurs SR transmission should be stopped or SR procedure should be stopped/suspended in MAC. By excluding the case in MAC, PHY may ensure that SR always has higher priority over RACH. Alternatively, or additionally, PHY may transmit the one (either SR or RACH) which is scheduled earlier.

Under a proposed scheme in accordance with the present disclosure, the UE may avoid simultaneous SR procedure and RACH procedure. Under the proposed scheme, there may be several approaches with respect to RACH initiation and some approaches with respect to SR initiation, as described below.

In one approach with respect to RACH initiation, a RACH procedure may not be initiated or, alternatively, the initiation of the RACH procedure may be postponed or otherwise delayed in an event that there is ongoing SR procedure and/or a scheduled PUSCH transmission. In another approach with respect to RACH initiation, whether a RACH procedure can be initiated may depend on a decision of MAC on RACH priority. For instance, a low-priority RACH procedure may not be triggered or the initiation of a low-priority RACH procedure may be postponed or otherwise delayed in an event that there is ongoing SR procedure and/or a scheduled PUSCH transmission. Additionally, a high-priority RACH procedure may be triggered without delay or cancellation. In an event that a high-priority RACH procedure to be triggered is initiated, an ongoing SR procedure and/or a scheduled PUSCH transmission may be stopped, suspended or otherwise canceled when the high-priority RACH procedure is triggered.

In one approach with respect to SR initiation, a SR procedure may not be initiated or, alternatively, the initiation of the SR procedure may be postponed or otherwise delayed in an event that there is an ongoing RACH procedure. In another approach with respect to SR initiation, whether a SR procedure can be initiated may depend on a decision of MAC on RACH priority. For instance, a SR procedure may not be triggered or the initiation of the SR procedure may be postponed or otherwise delayed in an event that there is an ongoing RACH procedure with a higher priority (e.g., for beam recovery). Additionally, in an event that there is an ongoing RACH procedure with a low priority (e.g., for low-priority data arrival), the RACH procedure may be canceled and the SR procedure may be initiated.

Under a proposed scheme in accordance with the present disclosure, MAC may allow parallel procedures while avoiding overlapped transmission. Under the proposed scheme, there may be several approaches based on which MAC may allow parallel procedures while avoiding overlapped transmission, as described below.

In one approach, MAC may specify a selection rule to select one UL channel to be transmitted (PRACH or PUCCH/PUSCH) in an event that simultaneous transmission occurs. In such cases, priority may be based on RACH intention or an absolute priority. Alternatively, it may be up to MAC to decide which one (either SR or RACH) to be transmitted in an event of overlap.

In one approach, it may be up to a wireless network to schedule PRACH to avoid overlap with SR. However, this approach may be inapplicable in certain cases because, for ultra-reliable low-latency communication (URLLC), the SR periodicity may probably be quite short. As such there may not be available RACH resource(s) not overlapped with PUCCH for SR. In another approach, a UE may select PRACH occasion not overlapped with already-scheduled PUCCH for SR during RACH resource selection in MAC in an event that SR has higher priority over RACH. The priority may be fixed or may depend on RACH intention. PRACH may be scheduled to avoid overlap with the following: (i) any PUCCH that is possible to be used for SR transmission, and/or (ii) the PUCCH of the SR configuration which is used by a SR procedure to signal SR.

In yet another approach, the UE may select PUCCH not overlapped with RACH resource(s) in an event that RACH has a higher priority. The priority may be fixed or may depend on RACH intention. It is noteworthy that, in an event that RACH has higher priority and that there are multiple PUCCH overlapped in time, the UE may perform one or more operations. For example, the UE may first determine to send PUCCH or PRACH in an event that there is at least one PUCCH overlapped with PRACH. In case that PUCCH is selected to be transmitted, the UE may select one PUCCH from multiple available PUCCHs. As another example, the UE may first select the set of PUCCHs not overlapped with PRACH, then the UE may send PRACH and one PUCCH from a subset of the set of PUCCHs that are not overlapped with PRACH on a separate time duration. In an event that all PUCCHs overlapped with the other PUCCH are overlapped with PRACH or are in the same slot as PRACH, then the UE may determine to send PUCCH or PRACH. In an event that PUCCH is selected to be transmitted, the UE may select one PUCCH from multiple available PUCCHs. As another example, the UE may first select one PUCCH from overlapped PUCCHs, and the UE may determine to send the selected PUCCH or the PRACH if the UE sends the selected PUCCH or the PRACH is overlapped. As another example, the UE may first select to send PRACH or SR in an event that at least one PUCCH is overlapped with PRACH. As another example, the UE may select one in an event that PUCCH is overlapped with the other PUCCH or that PUCCH is overlapped with PRACH. The UE may then send all those UL channels that are selected out and are not overlapped with any of the other UL channel(s) to be transmitted. As a further example, the order of overlap check or selection of overlap occurs may be up to UE implementation.

Under the proposed scheme for MAC to allow parallel procedures while avoiding overlapped transmission, in RACH procedure during PRACH selection, MAC may cancel SR transmission in case overlap occurs in an event that PRACH has a higher priority over PUCCH or PUSCH when the UE determines to send PRACH. Otherwise, the UE may select a PRACH not overlapped with PUCCH or PUSCH, or the UE may refrain from instructing PHY to transmit the selected PRACH. In the latter case, the UE may not increase current power ramping counter and/or preamble transmission counter. Under the proposed scheme, in an event that PRACH has a higher priority, the UE may always select PUCCH not overlapped with PRACH for preamble transmission. Otherwise, the UE may select PUCCH and cancel PRACH transmission in case overlap occurs.

Under a proposed scheme in accordance with the present disclosure, MAC may indicate RACH priority to instruct PHY which one should be skipped. For instance, MAC may always send an indication to PHY. Alternatively, PHY may keep a default priority order (e.g., PRACH>PUCCH/PUSCH), and MAC may send an indication when there is a different priority order (e.g., PRACH<PUCCH/PUSCH). This proposed scheme may be scalable to more RACH intentions (e.g., with high priority) in the future. Moreover, RACH and SR procedures may be handled in parallel under this proposed scheme. Under the proposed scheme, in an event that PRACH transmission is skipped, PHY may send an indication to notify MAC of power ramping suspension or keep preamble transmission counter unchanged. Additionally, in an event that SR transmission is skipped, PHY may send an indication to notify MAC to update the counter SR_COUNTER, which is used to count the number of SR transmissions of a SR configuration. For example, this may be done to not increment SR_COUNTER for a given SR transmission as a valid count.

Figure 1:
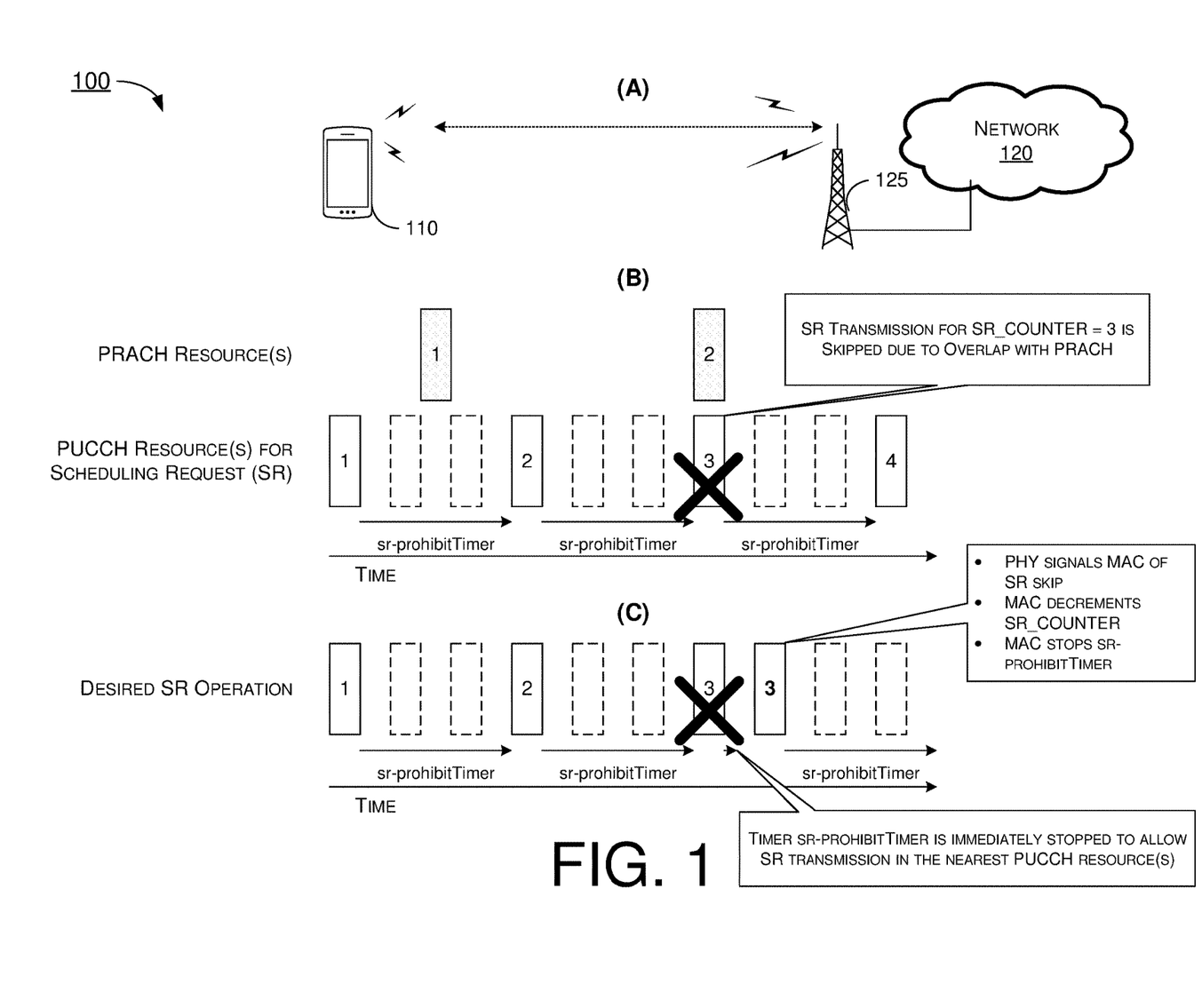
FIG. 1 is a diagram of an example scenario in accordance with an implementation of the present disclosure.

FIG. 1 illustrates an example scenario 100 in accordance with an implementation of the present disclosure. Referring to part (A) of FIG. 1, scenario 100 may involve a user equipment (UE) 110 in wireless communication with a wireless network 120 (e.g., a 5th-Generation (5G) NR mobile network) via a base station or network node 125 (e.g., a gNB or transmit-receive point (TRP)). In scenario 100, UE 110 may perform wireless communications with wireless network 120 via base station 125 using one or more of various proposed schemes in accordance with the present disclosure. The follow description of one proposed scheme in accordance with the present disclosure is provided with reference to part (A), part (B) and part (C) of FIG. 1.

Referring to part (B) of FIG. 1, when there is an overlap between one or more resources of a SR procedure and one or more resources of a RACH procedure, in an event that the RACH procedure is to be performed (e.g., due to higher priority than the SR procedure), SR transmission when the value of a counter SR_COUNTER is incremented to 3 may be skipped due to the overlap. Referring to part (C) of FIG. 1, under a proposed scheme in accordance with the present disclosure, a physical layer (PHY) of a processor of UE 110 may inform a medium access control layer (MAC) of the processor of UE 110 about the decision to skip the SR procedure. In response, when the RACH procedure is being performed, the MAC may decrement the value of the counter SR_COUNTER by 1 and stop a timer sr-prohibitTimer. The timer sr-prohibitTimer is immediately stopped so as to allow an UL transmission for the SR procedure in the nearest PUCCH resource(s). Here, both the counter SR_COUNTER and the timer sr-prohibitTimer may be used by the processor in controlling UL transmissions for performing the SR procedure. Advantageously, potential additional SR/RACH latency may be avoided or otherwise reduced. Correspondingly, system performance as well as user experience may be enhanced.

Illustrative Implementations

Figure 2:
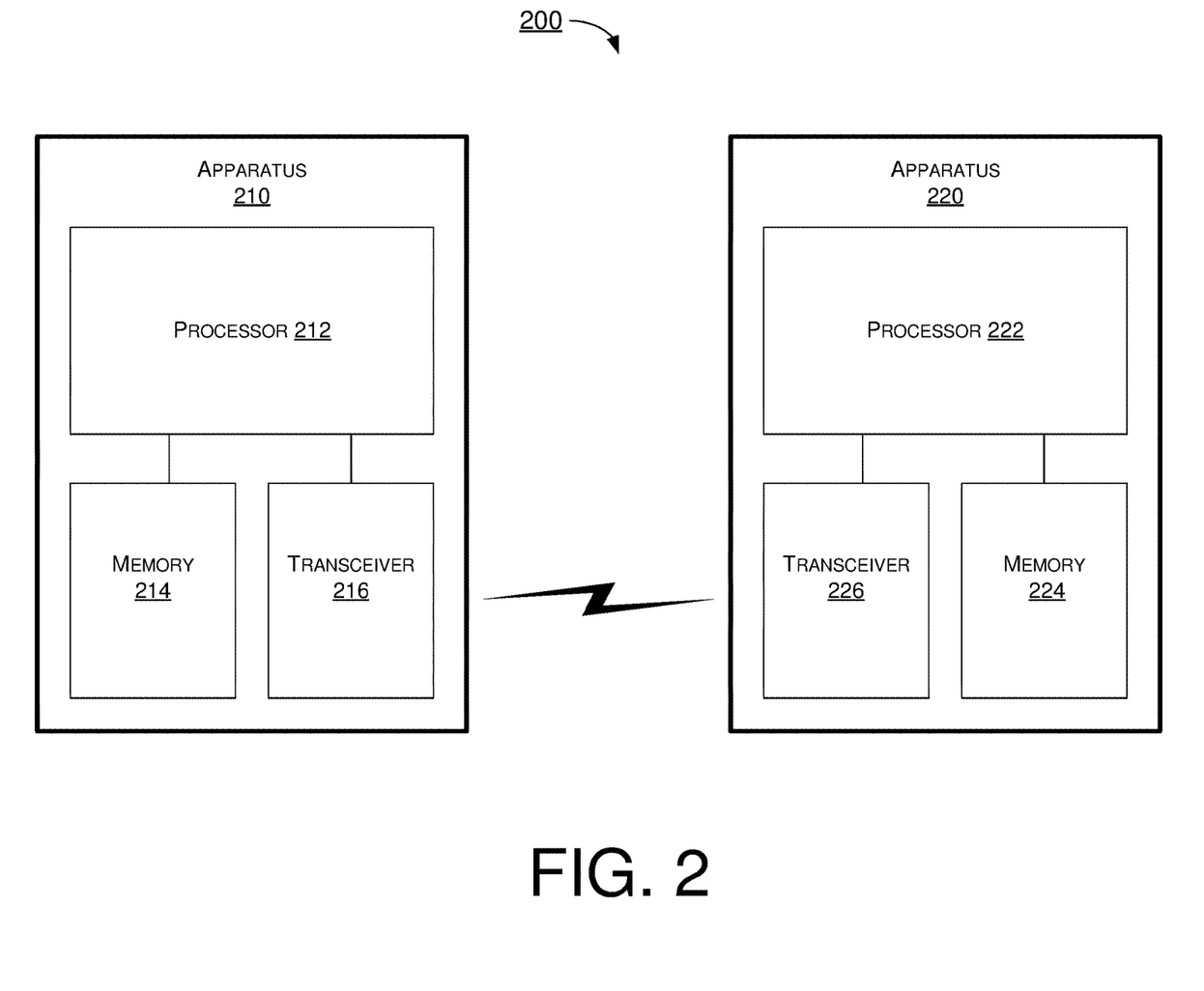
FIG. 2 is a block diagram of an example system in accordance with an implementation of the present disclosure.

FIG. 2 illustrates an example system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to handling of simultaneous transmission of PRACH and other UL channels in mobile communications, including the various schemes described above with respect to various proposed designs, concepts, schemes, systems and methods described above as well as process 200 described below. For instance, apparatus 210 may be an example implementation of UE 110, and apparatus 220 may be an example implementation of base station 125.

Each of apparatus 210 and apparatus 220 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 210 and apparatus 220 may be implemented in a smartphone, a smart watch, a personal digital assistant, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in a base station (e.g., base station 125), such as an eNB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to handling of simultaneous transmission of PRACH and other UL channels in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, apparatus 220 may also include a transceiver 226 coupled to processor 222. Transceiver 226 may include a transceiver capable of wirelessly transmitting and receiving data.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE, and apparatus 220, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 210 as a UE (e.g., UE 110), the same is also applicable to apparatus 220 as a network node or base station such as a gNB, TRP or eNodeB (e.g., base station 125) of a wireless network (e.g., wireless network 120) such as a 5G/NR mobile network.

Under a proposed scheme with respect to handling of simultaneous transmission of PRACH and other UL channels in mobile communications in accordance with the present disclosure, processor 212 of apparatus 210 may determine to skip an UL transmission to apparatus 220 for either a first procedure or a second procedure. Responsive to determining to skip transmission of the first procedure, processor 212 may perform the second procedure and adjust one or more parameters associated with the first procedure.

In some implementations, the first procedure may include a SR procedure, and the second procedure may include a RACH procedure. Alternatively, the first procedure may include a RACH procedure, and the second procedure may include a SR procedure.

In some implementations, in determining to skip the UL transmission for either the first procedure or the second procedure, processor 212 may determine to skip the UL transmission for either the first procedure or the second procedure responsive to an overlap between one or more resources for the first procedure and one or more resources for the second procedure.

In some implementations, the one or more parameters associated with the first procedure may include a counter and a timer each of which being used in controlling UL transmissions for the first procedure.

In some implementations, in adjusting the one or more parameters associated with the first procedure, processor 212 may perform some operations. For instance, processor 212 may decrement the counter which is incremented when performing the second procedure. Additionally, processor 212 may increment the counter after performing the second procedure.

In some implementations, in adjusting the one or more parameters associated with the first procedure, processor 212 may perform some operations. For instance, processor 212 may stop the timer when performing the second procedure. Moreover, processor 212 may continue the timer after performing the second procedure.

In some implementations, in adjusting the one or more parameters associated with the first procedure, processor 212 may perform some operations. For instance, when performing the second procedure, processor 212 may decrement the counter which is incremented as well as stop the timer. Moreover, after performing the second procedure, processor 212 may increment the counter as well as continue the timer.

Under another proposed scheme with respect to handling of simultaneous transmission of PRACH and other UL channels in mobile communications in accordance with the present disclosure, a physical layer (PHY) of processor 212 of apparatus 210 may determine to skip an UL transmission to apparatus 220 for either a first procedure or a second procedure. Additionally, the PHY may signal an indication to a medium access control layer (MAC) of processor 212 regarding the determining to skip. Moreover, the MAC may update a status of one or more parameters of the first procedure or the second procedure which is skipped to a status before the MAC signals the PHY to perform the UL transmission for the first procedure or the second procedure which is not skipped. Furthermore, the PHY may perform the UL transmission for one of the first procedure and second procedure which is not skipped.

In some implementations, the first procedure may include a SR procedure, and the second procedure may include a RACH procedure. In such cases, in determining to skip the UL transmission, the PHY may determine to skip the UL transmission responsive to an overlap between one or more SR resources and one or more RACH resources.

In some implementations, in performing the UL transmission, the PHY may perform the UL transmission for the RACH procedure while the SR procedure is skipped. In such cases, in updating the status of one or more parameters, the MAC may perform some operations. For instance, the MAC may decrement a preamble transmission counter by 1. Additionally, the MAC may stop a RAR window for the RACH procedure. Furthermore, the MAC may enter into a process of random access resource selection.

In some implementations, in performing the UL transmission, the PHY may perform the UL transmission for a SR procedure while a RACH procedure is skipped. In such cases, in updating the status of one or more parameters, the MAC may perform some operations. For instance, the MAC may decrement a SR counter by 1. Moreover, the MAC may stop a SR prohibit timer for the SR procedure.

Illustrative Processes

Figure 3:
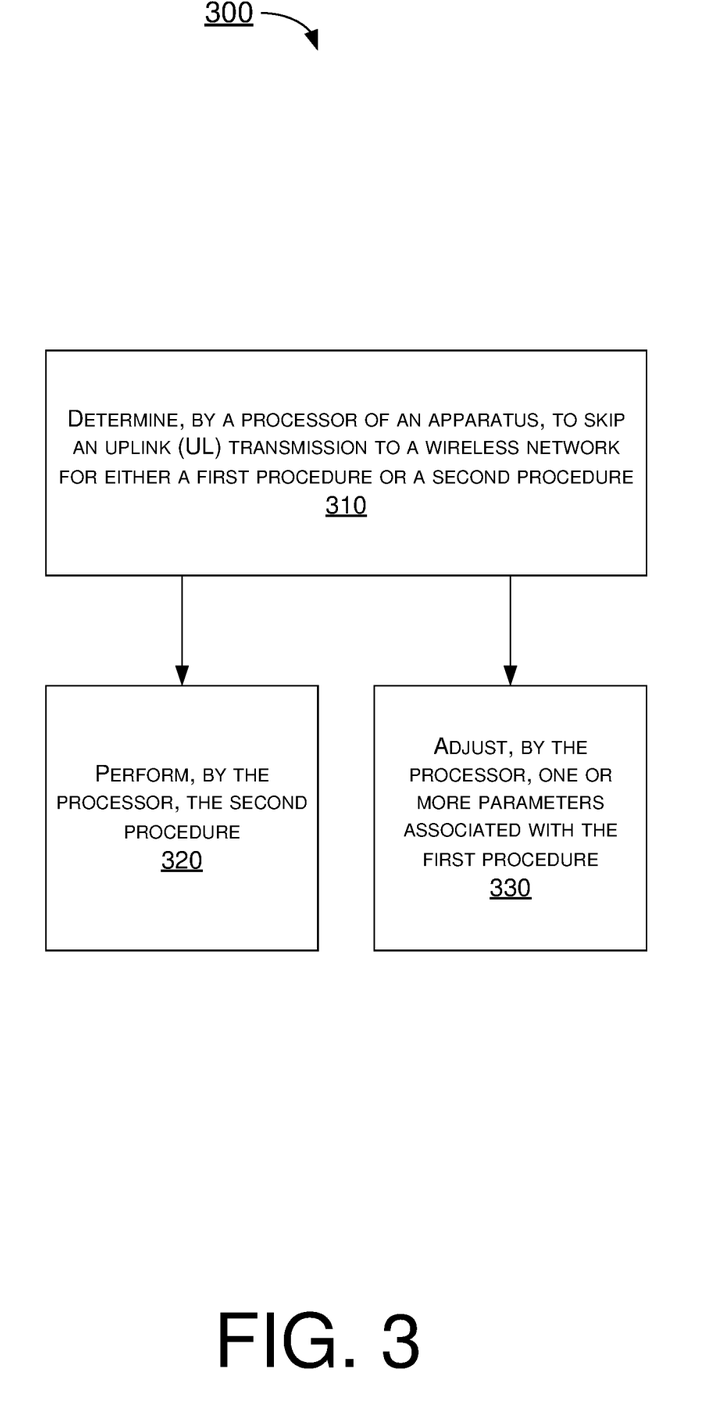
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above. More specifically, process 300 may represent an aspect of the proposed concepts and schemes pertaining to handling of simultaneous transmission of PRACH and other UL channels in mobile communications. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed repeatedly or iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a base station (e.g., base station 125) of a wireless network (e.g., wireless network 120) such as a 5G/NR mobile network. Process 300 may begin at block 310.

At 310, process 300 may involve processor 212 of apparatus 210 determining to skip an UL transmission to apparatus 220 for either a first procedure or a second procedure. Responsive to determining to skip transmission of the first procedure, process 300 may involve processor 212 some operations as represented by 320 and 330. Process 300 may proceed from 310 to 320 and 330.

At 320, process 300 may involve processor 212 performing the second procedure.

At 330, process 300 may involve processor 212 adjusting one or more parameters associated with the first procedure.

In some implementations, the first procedure may include a SR procedure, and the second procedure may include a RACH procedure. Alternatively, the first procedure may include a RACH procedure, and the second procedure may include a SR procedure.

In some implementations, in determining to skip the UL transmission for either the first procedure or the second procedure, process 300 may involve processor 212 determining to skip the UL transmission for either the first procedure or the second procedure responsive to an overlap between one or more resources for the first procedure and one or more resources for the second procedure.

In some implementations, the one or more parameters associated with the first procedure may include a counter and a timer each of which being used in controlling UL transmissions for the first procedure.

In some implementations, in adjusting the one or more parameters associated with the first procedure, process 300 may involve processor 212 performing some operations. For instance, process 300 may involve processor 212 decrementing the counter which is incremented when performing the second procedure. Additionally, process 300 may involve processor 212 incrementing the counter after performing the second procedure.

In some implementations, in adjusting the one or more parameters associated with the first procedure, process 300 may involve processor 212 performing some operations. For instance, process 300 may involve processor 212 stopping the timer when performing the second procedure. Moreover, process 300 may involve processor 212 continuing the timer after performing the second procedure.

In some implementations, in adjusting the one or more parameters associated with the first procedure, process 300 may involve processor 212 performing some operations. For instance, when performing the second procedure, process 300 may involve processor 212 decrementing the counter which is incremented as well as stopping the timer. Moreover, after performing the second procedure, process 300 may involve processor 212 incrementing the counter as well as continuing the timer.

Figure 4:
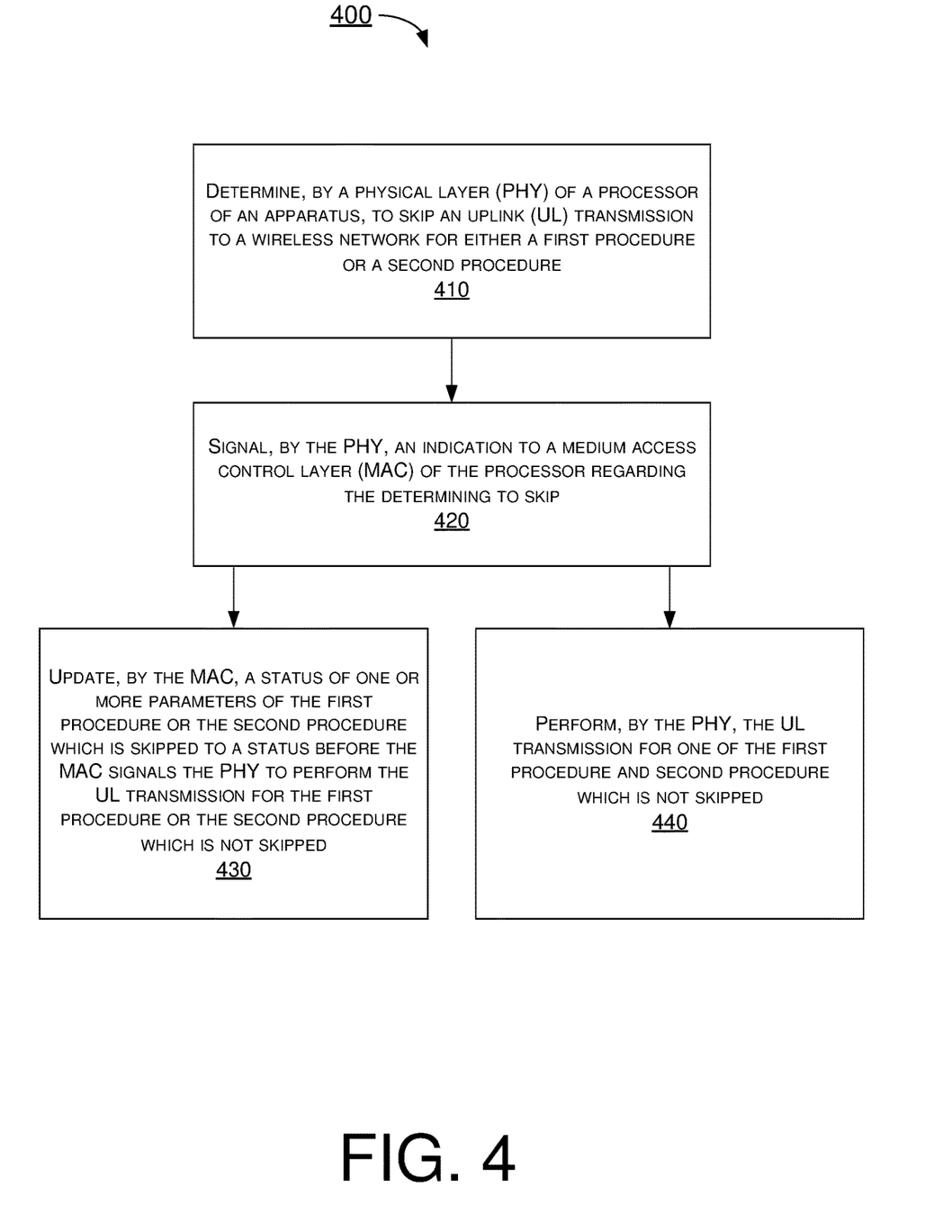
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above. More specifically, process 400 may represent an aspect of the proposed concepts and schemes pertaining to handling of simultaneous transmission of PRACH and other UL channels in mobile communications. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed repeatedly or iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a base station (e.g., base station 125) of a wireless network (e.g., wireless network 120) such as a 5G/NR mobile network. Process 400 may begin at block 410.

At 410, process 400 may involve a physical layer (PHY) of processor 212 of apparatus 210 determining to skip an UL transmission to apparatus 220 for either a first procedure or a second procedure. Process 400 may proceed from 410 to 420.

At 420, process 400 may involve processor 212 the PHY signaling an indication to a medium access control layer (MAC) of processor 212 regarding the determining to skip. Process 400 may proceed from 420 to 430 and 440.

At 430, process 400 may involve the MAC updating a status of one or more parameters of the first procedure or the second procedure which is skipped to a status before the MAC signals the PHY to perform the UL transmission for the first procedure or the second procedure which is not skipped.

At 440, process 400 may involve the PHY performing the UL transmission for one of the first procedure and second procedure which is not skipped.

In some implementations, the first procedure may include a SR procedure, and the second procedure may include a RACH procedure. In such cases, in determining to skip the UL transmission, process 400 may involve the PHY determining to skip the UL transmission responsive to an overlap between one or more SR resources and one or more RACH resources.

In some implementations, in performing the UL transmission, process 400 may involve the PHY performing the UL transmission for the RACH procedure while the SR procedure is skipped. In such cases, in updating the status of one or more parameters, process 400 may involve the MAC performing some operations. For instance, process 400 may involve the MAC decrementing a preamble transmission counter by 1. Additionally, process 400 may involve the MAC stopping a RAR window for the RACH procedure. Furthermore, process 400 may involve the MAC entering into a process of random access resource selection.

In some implementations, in performing the UL transmission, process 400 may involve the PHY performing the UL transmission for a SR procedure while a RACH procedure is skipped. In such cases, in updating the status of one or more parameters, process 400 may involve the MAC performing some operations. For instance, process 400 may involve the MAC decrementing a SR counter by 1. Moreover, process 400 may involve the MAC stopping a SR prohibit timer for the SR procedure.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, to skip an uplink (UL) transmission to a wireless network for either a first procedure or a second procedure; and
   responsive to determining to skip transmission of the first procedure:
      performing, by the processor, the second procedure; and
      adjusting, by the processor, either or both of a timer and a counter used in controlling UL transmissions for the first procedure,
   wherein the adjusting of either or both of the timer and the counter comprises performing a first operation, a second operation or a third operation,
   wherein the first operation comprises:
      ceasing change of the counter which is incremented when performing the second procedure; and
      incrementing the counter after performing the second procedure,
   wherein the second operation comprises:
      stopping the timer when performing the second procedure; and
      continuing the timer after performing the second procedure, and
   wherein the third operation comprises:
      when performing the second procedure:
         ceasing change of the counter which is incremented; and
         stopping the timer, and
      after performing the second procedure:
         incrementing the counter; and
         continuing the timer.

2. The method of claim 1, wherein the first procedure comprises a scheduling request (SR) procedure, and wherein the second procedure comprises a random access channel (RACH) procedure.

3. The method of claim 1, wherein the first procedure comprises a random access channel (RACH) procedure, and wherein the second procedure comprises a scheduling request (SR) procedure.

4. The method of claim 1, wherein the determining to skip the UL transmission for either the first procedure or the second procedure comprises determining to skip the UL transmission for either the first procedure or the second procedure responsive to an overlap between one or more resources for the first procedure and one or more resources for the second procedure.

5. A method, comprising:
   determining, by a physical layer (PHY) of a processor of an apparatus, to skip an uplink (UL) transmission to a wireless network for either a first procedure or a second procedure;
   signaling, by the PHY, an indication to a medium access control layer (MAC) of the processor regarding the determining to skip;
   updating, by the MAC, a status of one or more parameters of the first procedure or the second procedure which is skipped to a status before the MAC signals the PHY to perform the UL transmission for the first procedure or the second procedure which is not skipped; and
   performing, by the PHY, the UL transmission for one of the first procedure and second procedure which is not skipped.

6. The method of claim 5, wherein the first procedure comprises a scheduling request (SR) procedure, wherein the second procedure comprises a random access channel (RACH) procedure, and wherein the determining to skip the UL transmission comprises determining to skip the UL transmission responsive to an overlap between one or more SR resources and one or more RACH resources.

7. The method of claim 5, wherein the performing of the UL transmission comprises performing the UL transmission for a random access channel (RACH) procedure while a scheduling request (SR) procedure is skipped, and wherein the updating of the status of one or more parameters comprises:
   stopping a random access response (RAR) window for the RACH procedure; and
   entering into a process of random access resource selection.

8. The method of claim 5, wherein the performing of the UL transmission comprises performing the UL transmission for a scheduling request (SR) procedure while a random access channel (RACH) procedure is skipped, and wherein the updating of the status of one or more parameters comprises:
   stopping a SR prohibit timer for the SR procedure.

9. An apparatus, comprising:
   a transceiver which, during operation, wirelessly communicates with a wireless network; and
   a processor coupled to the transceiver such that, during operation, the processor performs operations comprising:
      determining to skip an uplink (UL) transmission to the wireless network for either a first procedure or a second procedure; and
      responsive to determining to skip transmission of the first procedure:
         performing, via the transceiver, the second procedure; and
         adjusting either or both of a timer and a counter used in controlling UL transmissions for the first procedure,
   wherein the adjusting of either or both of the timer and the counter comprises performing a first operation, a second operation or a third operation,
   wherein the first operation comprises:
      ceasing change of the counter which is incremented when performing the second procedure; and
      incrementing the counter after performing the second procedure,
   wherein the second operation comprises:
      stopping the timer when performing the second procedure; and continuing the timer after performing the second procedure, and wherein the third operation comprises:
when performing the second procedure:
ceasing change of the counter which is incremented; and
stopping the timer, and
after performing the second procedure:
incrementing the counter; and
continuing the timer.

10. The apparatus of claim 9, wherein the first procedure comprises a scheduling request (SR) procedure, and wherein the second procedure comprises a random access channel (RACH) procedure.

11. The apparatus of claim 9, wherein the first procedure comprises a random access channel (RACH) procedure, and wherein the second procedure comprises a scheduling request (SR) procedure.

12. The apparatus of claim 9, wherein, in determining to skip the UL transmission for either the first procedure or the second procedure, the processor determines to skip the UL transmission for either the first procedure or the second procedure responsive to an overlap between one or more resources for the first procedure and one or more resources for the second procedure.

* * * * *